United States Patent [19]

Herbin et al.

[11] Patent Number: 4,844,143
[45] Date of Patent: Jul. 4, 1989

[54] MOLD FOR FIXING A METAL BLOCK ON ONE OF THE FACES OF AN OPHTHALMIC LENS

[75] Inventors: Patrick Herbin, Morlaincourt; Jean-Claude Lacrois, Ligny-en-Barrois, both of France

[73] Assignee: Essilor International (Compagnie Generale d'Optique), Creteil, France

[21] Appl. No.: 173,295

[22] Filed: Mar. 25, 1988

[30] Foreign Application Priority Data

Mar. 30, 1987 [FR] France .................. 87 04374

[51] Int. Cl.⁴ ........................... B22D 19/00
[52] U.S. Cl. ........................ 164/332; 51/216 LP;
51/217 L; 164/112; 164/334; 249/65; 249/83;
249/109; 249/155; 269/7; 269/22; 279/1 D;
425/808
[58] Field of Search ........... 249/65, 83, 91, 109,
249/112, 134, 155; 425/126 R, 129.1, 808,
405.2; 264/1.1, 1.7, 2.2, 2.7; 51/277, 216 LP,
217 L, 217 T, 284 R; 269/7, 22; 279/1 D, 1 Q,
4; 164/112, 332, 334

[56] References Cited

U.S. PATENT DOCUMENTS

| | | | |
|---|---|---|---|
| 3,221,378 | 12/1965 | Faas et al. | 425/808 |
| 3,330,331 | 7/1967 | Duckwall et al. | 425/808 |
| 3,353,307 | 11/1967 | Sarofeen | 51/216 LP |
| 3,865,178 | 2/1975 | Legendre | 51/216 LP |
| 3,886,696 | 6/1975 | Duckwall et al. | 51/216 LP |
| 3,951,203 | 4/1976 | Prunier | 249/91 |
| 4,372,368 | 2/1983 | Lombard | 425/808 |
| 4,669,226 | 6/1987 | Mandler | 51/216 LP |

FOREIGN PATENT DOCUMENTS

| | | | |
|---|---|---|---|
| 0169932 | 2/1986 | European Pat. Off. | |
| 1014564 | 8/1952 | France | 51/216 LP |
| 2204990 | 5/1974 | France | |
| 2409849 | 6/1979 | France | |
| 2465562 | 3/1981 | France | |
| 57-103799 | 6/1982 | Japan | 425/405.2 |

*Primary Examiner*—James Housel
*Attorney, Agent, or Firm*—Oblon, Spivak, McClelland, Maier & Neustadt

[57] ABSTRACT

The cylindrical side wall of the mold cavity (8) has an inside diameter (D) which is greater than the largest existing ophthalmic lens diameter, and a generally cylindrical membrane (25) of elastomer material is disposed concentrically inside the mold cavity so that in conjunction with the cylindrical side wall of the cavity it defines a variable volume annular chamber (31), the membrane being expansible and retractable radially under the action of a fluid which is alternatively removed from and admitted to the annular chamber.

10 Claims, 1 Drawing Sheet

MOLD FOR FIXING A METAL BLOCK ON ONE OF THE FACES OF AN OPHTHALMIC LENS

BACKGROUND OF THE INVENTION

1. Field of the Invention

The present invention relates to a mold for fixing a metal block on one of the faces of an ophthalmic lens, the mold including an open mold cavity having a bottom wall and a cylindrical side wall.

2. Discussion of the Background

When manufacturing and preparing ophthalmic lenses, it is known practice to fix a metal block on one of the faces of a lens in order to enable the lens to be mounted on the lens holder of a surfacing machine, an edging machine, or a polishing or clear-polishing machine. This operation is usually performed by means of an apparatus including a mold of the type defined above and by casting a low melting point metal into the cavity of the mold. Such an apparatus is described, for example, in French Pat. No. 2 465 562. As can be seen in FIG. 2 of said French patent, the mold 3 is fitted with a removable ring 7 which includes an annular seat 9 and a cylindrical peripheral rim 11, both of which are coaxial with the axis of the mold cavity. The annular seat 9 is provided to support the face of the lens on which the metal block is to be fixed, whereas the peripheral rim 11 whose inside diameter corresponds to the outside diameter of the lens is provided for centering said lens relative to the mold cavity. It is necessary to provide a plurality of rings for such a prior art mold with the rings having rims of different inside diameters corresponding to the respective existing different diameters of ophthalmic lenses, and the ring needs changing each time the diameter of the lens on which a metal block is to be fixed differs from the diameter of the lens on which a metal block has just been fixed. Such ring changing impedes full automation of this procedure. Further, the above-mentioned rings are relatively expensive items insofar as the inside diameters of their peripheral rims must be machined with relatively high accuracy in order to ensure that the lens is accurately centered relative to the mold cavity.

SUMMARY OF THE INVENTION

The object of the present invention is therefore to provide a single mold whose mold cavity is capable of receiving ophthalmic lenses of any existing diameter, and in which the part that comes into contact with the periphery of the lens is not required to be machined very accurately.

The present invention provides a mold for fixing a metal block on one of the faces of an ophthalmic lens, the mold comprising an open mold cavity having a bottom wall and a cylindrical side wall, the cylindrical side wall of the mold cavity having an inside diameter D which is greater than the largest existing ophthalmic lens diameter, said mold further including a generally cylindrical membrane of elastomer material which is concentrically disposed inside the mold cavity and which, together with the cylindrical side wall of said cavity, defines a variable volume annular chamber, said membrane being radially expansible and retractable under the action of a fluid which is alternatively removed from and admitted to said annular chamber.

In one embodiment of the present invention, the membrane is preferably made of latex and, when in the rest position, has an inside diameter which is smaller than the smallest existing ophthalmic lens diameter. In this case, in order to put a lens into place in the mold cavity, a vacuum is set up in the variable volume annular chamber. This has the effect of increasing the inside diameter of the membrane which comes practically into contact with the cylindrical side wall of the mold. Once a lens has been inserted into the mold cavity, atmospheric pressure is re-established in the variable volume annular chamber, thereby allowing the membrane to tend, under its own elasticity, to return to its initial shape, and thus come into contact with the peripheral edge of the lens and fit tightly thereabout, regardless of the outside diameter of the lens. Although not absolutely essential in theory, compressed air at low pressure may optionally be admitted into the variable volume annular chamber in order to assist the membrane in returning to its initial shape. After a low melting point metal has been cast into the cavity of the mold through a casting orifice provided in the bottom wall of said cavity, and after the metal has cooled, a vacuum is again established in the variable volume annular chamber in order to move the membrane away from the peripheral edge of the lens and the cast metal block, thereby enabling said lens to be extracted together with said metal block.

In another embodiment of the present invention, the inside diameter of the elastomer membrane when the membrane is at rest may be larger than the diameter of the largest existing ophthalmic lens. In this case, once a lens has been inserted in the mold cavity, a fluid under pressure, e.g. compressed air, is injected into the variable volume annular chamber in order to cause the membrane to fit tightly around the peripheral edge of the lens. After the low melting point metal has been cast in the mold cavity and has cooled down, the fluid under pressure is removed from the variable volume annular chamber, e.g. by putting the chamber under atmospheric pressure, and the membrane tends, under its own elasticity, to return to its initial shape, and it may optionally be assisted by putting said variable volume annular chamber under a slightly reduced pressure.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
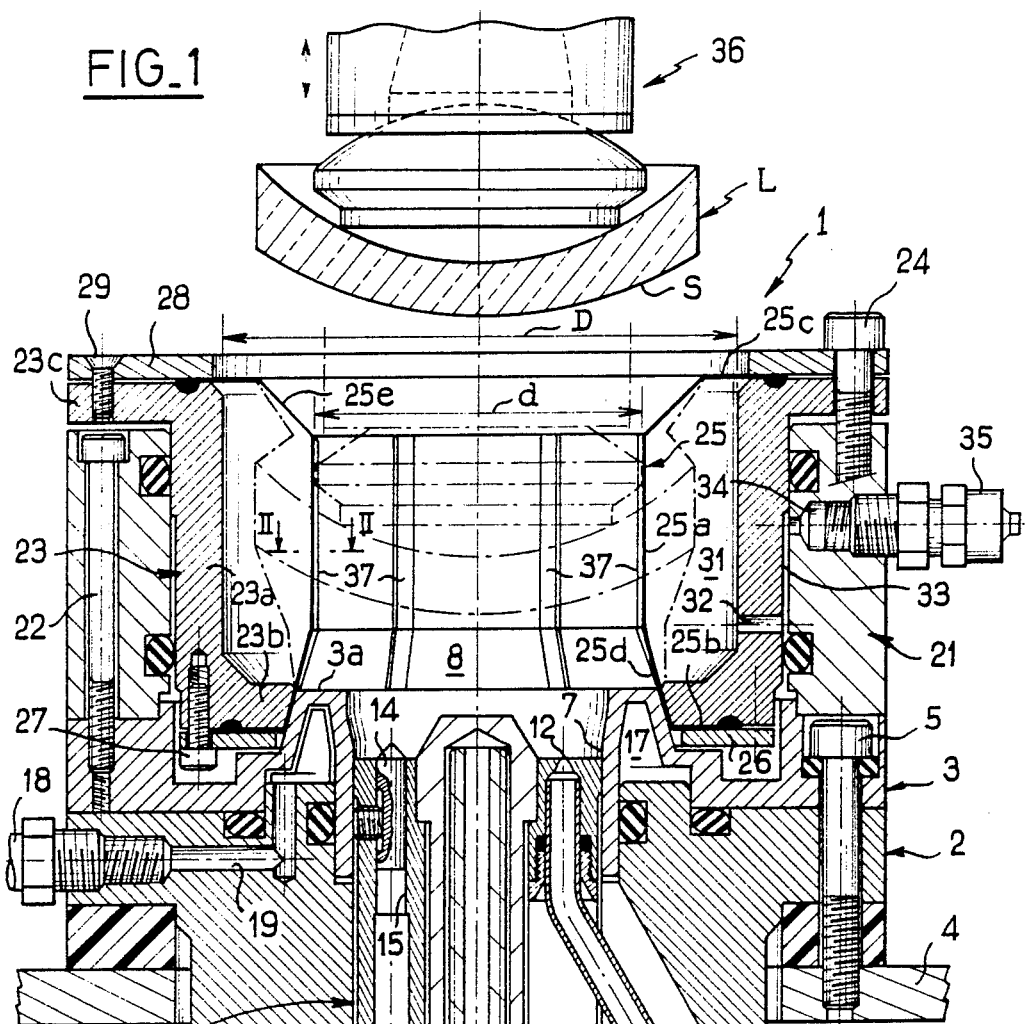
FIG. 1 is a vertical section through a mold in accordance with the present invention.
Figure 2:
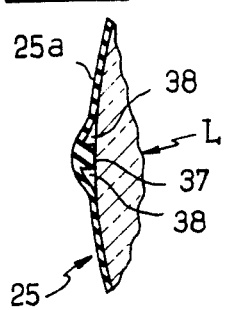
FIG. 2 is a section on line II—II of FIG. 1 showing a detail of the FIG. 1 mold membrane on a larger scale.

The mold shown in FIG. 1 comprises two superposed parts 2 and 3 which are generally annular in shape, and which are fixed coaxially to each other and to a support plate 4 by means of screws 5 (with only one screw 5 being visible in FIG. 1). The central holes 6 and 7 of the parts 2 and 3 are aligned and they have the same inside diameter. The part 3 constitutes a portion of the bottom wall of the mold cavity 8, with the remaining portion of the bottom wall of said cavity being formed by the top end face of a cylindrical part 9 tightly engaged in the holes 6 and 7 and fixed to the part 2 by a locking screw 11. A low melting point metal may be inserted into the mold cavity 8 via a casting orifice 12 through the part 9, which orifice is connected by a pipe 13 to a reservoir (not shown) containing molten metal. The orifice 12 is preferably tapering in shape with its small end being adjacent to the cavity 8 and its large end being adjacent to the pipe 13. A cylindrical stud 14 is fixed in an off-center cylindrical hole 15 in the part 9. The stud 14 has a conical tip which projects into the mold cavity 8 and which is intended, in conventional manner, to form a recess in the metal block cast in the cavity 8 suitable for subsequently angularly indexing the metal block on the lens-holder of a surfacing machine, of an edging machine, or of a polishing machine. A rod 16 is slidably mounted in a central hole through the part 9 and serves, in conventional manner, to eject the cast metal block (and the lens attached thereto) after said metal block has cooled, with ejection being performed by raising the rod 16.

As shown in FIG. 1, the parts 2 and 3 are shaped in such a manner as to form an annular chamber 17 therebetween with a cooling fluid flowing therein, which fluid arrives via a connector 18 and a passage 19 through the part 2 and leaves via another passage and another connector (not shown) which are similar to the passage 19 and the connector 18.

The mold 1 further includes a part 21 which is cylindrical in shape and is fixed coaxially in removable manner by screws 22 to the part 3, and another part 23 which is generally cylindrical and which is detachably fixed by means of screws 24 to the part 21. The part 23 includes a cylindrical portion 23a which is closely engaged in the part 21 and whose inside diameter D is greater than the largest existing ophthalmic lens diameter (currently 80 mm). The bottom end of the cylindrical portion 23a of the part 23 close to the bottom of the mold cavity 8 includes an annular lip 23b extending radially inwardly and which closely surrounds a projecting portion 3a of the part 3. The top end of the cylindrical portion 23a of the part 23 close to the opening of the mold cavity 8 includes an annular flange 23c which extends radially outwardly.

A membrane 25 made of elastomer material, e.g. latex, is disposed concentrically inside the mold cavity 8. The membrane 25 may be between 0.5 mm and 1 mm thick and it comprises a cylindrical portion 25a together with plane annular portions 25b and 25c at its ends which extend radially outwardly. The portion 25b of the membrane 25 is fixed by being clamped between the lip 23b of the part 23 and a washer 26 which is itself fixed to the part 23 by screws 27 (with only one of the screws 27 being visible in FIG. 1). Similarly, the portion 25c of the membrane 25 is fixed by being clamped between the flange 23c of the part 23 and another washer 28 which is itself fixed to the flange 23c by screws 29 (with only one of the screws 29 being visible in FIG. 1).

The cylindrical portion 25a of the membrane 25 is preferably connected to the plane annular portions 25b and 25c by two flared portions 25d and 25e, respectively, each of which flares away from the cylindrical portion 25a. In this case, the projecting portion 3a of the part 3 and the central hole of the lip 23b are frustoconical in shape and have the same taper as the flared portion 25d of the membrane 25 wich is sandwiched between the portion 3a of the part 3 and the annular lip 23bb.

In conjunction with mold part 23, the membrane 25 defines a variable volume annular chamber 31. In the embodiment shown in FIG. 1, the cylindrical portion 25a of the membrane 25 has an inside diameter d in the rest condition which is smaller than the smallest existing outside diameter of an ophthalmic lens. A vacuum may be established in the chamber 31 via a passage comprising a first radial bore 32 through the cylindrical portion 23a of the part 23, an annular chamber 33 provided between the parts 21 and 23, and a second radial bore 34 through the part 21. The bore 34 is tapped over a portion of its length to receive a connector 35 which is connected by means of a pipe (not shown) to a vacuum source (also not shown).

In order to fix a metal block on one of the faces of an ophthalmic lens, for example the convex face S of the lens L shown in FIG. 1, said lens is initially positioned and oriented (orientation of its prism axis if it is a prismatic lens, or of its cylinder axis if it is a toric lens, . . . ) relative to a frame of reference by means of a positioning and orienting device (not shown) situated adjacent to the mold. Thereafter, the lens L is picked up by suction-type grasping means 36 (FIG. 1) forming a portion of a transfer system, and it is moved by the transfer system so as to be above the opening to the mold cavity 8 in the predefined orientation and position. The variable volume chamber 31 is then evacuated in order to expand the membrane 25 radially outwardly until it comes practically into contact with the inside wall of the part 23. Then, the lens L is inserted into the mold cavity 8 by means of the above-mentioned transfer system until it occupies the position shown in dot-dashed lines in FIG. 1, and it is held in the mold cavity in the predefined orientation and the predefined position. Atmospheric pressure is then reestablished in the chamber 31 so that by returning to its initial shape under its own elasticity the membrane 25 fits tightly around the peripheral edge of the lens L. A low melting point metal is then cast into the cavity 8 through the pipe 13 and the casting orifice 12. In order to allow the air imprisoned in the cavity 8 to escape, at least the cylindrical portion 25a of the membrane 25 includes longitudinal ribs 37 of small radial extent running along its inside face, for example it may include six ribs, of which four can be seen in FIG. 1. In this way, when the membrane 25 is pressed against the peripheral edge of the lens L, two small section passages 38 are provided on either side of each rib 37 to allow the air contained in the cavity 8 to escape while the cavity is being filled with molten metal.

After the metal has cooled, the chamber 31 is again evacuated in order to expand the membrane 25 radially outwardly. This has the effect of partially unmolding the metal block cast in the cavity 8. Thereafter, the metal block and the lens attached thereto are detached from the bottom of the mold cavity 8 by means of the ejector rod 16 and they are removed from the mold cavity by means of the grasping device 36 and the transfer system. The mold 1 is then ready to receive another lens.

Naturally, the embodiment of the present invention described above has been given purely by way of non-limiting example and numerous modifications may easily be made thereto by the person skilled in the art without going beyond the scope of the invention. Thus, as already mentioned above, the cylindrical portion 25a of the membrane 25 may have an inside diameter d when at rest which is greater than the largest existing diameter of ophthalmic lens. In this case, the membrane 25 fits tightly around the peripheral edge of the lens L when compressed air is admitted into the variable volume chamber 31.

What is claimed as new and desired to be secured by letters patent of the United States is:

1. A mold for fixing a metal block on one of the faces of an ophthalmic lens, the mold comprising:
   an open mold cavity having a bottom wall, a cylindrical side wall and, opposite to said bottom wall, an opening through which an ophthalmic lens can be introduced into said mold cavity, the cylindrical side wall of the mold cavity having an inside diameter which is greater than a first ophthalmic lens diameter, said bottom wall having first passage means for admitting therethrough a molten metal into the mold cavity;
   a generally cylindrical membrane of elastomer material which is concentrically disposed inside the mold cavity and which, together with the cylindrical side wall of said cavity, defines a variable volume annular chamber, second passage means being provided in the cylindrical wall of the mold cavity for removing and admitting therethrough a fluid from and to the annular chamber, whereby said membrane is radially expansible and retractable under the action of the fluid which is alternatively removed from and admitted to said annular chamber.

2. A mold according to claim 1, wherein the cylindrical membrane is made of latex and is between 0.5 mm and 1 mm thick.

3. A mold according to claim 1, wherein the cylindrical membrane has an inside diameter when at rest which is smaller than a second ophthalmic lens diameter, said second diameter being smaller than said first diameter.

4. A mold according to claim 3, wherein the cylindrical membrane includes a cylindrical portion and, at each end of the cylindrical portion, a plane annular portion extending radially outwardly towards the cylindrical side wall of the mold cavity, the two plane annular portions of the membrane being fixed to the mold respectively close to the bottom and close to the opening of the mold cavity.

5. A mold according to claim 4, wherein an inner face of the cylindrical portion of the membrane includes a plurality of longitudinally extending ribs.

6. A mold according to claim 4, wherein the membrane further includes two flared portions interconnecting the cylindrical portion with respective ones of said plane annular portions, said flared portions flaring away from the cylindrical portion.

7. A mold according to claim 4, comprising:
   a first part forming a portion of the bottom wall of the mold cavity;
   a second part in the form of a hollow cylinder which is detachably fixed to said first part;
   a generally cylindrical third part which is detachably fixed to the second part and which includes a cylindrical portion which is closely engaged in the second part and whose inside diameter is greater than said first diameter, said cylindrical portion forming the cylindrical side wall of the mold cavity, a lip annular portion extending radially inwardly from that end of the cylindrical portion of the third part which is closer to the bottom of the mold cavity, and a flange annular portion extending radially outwardly from the other end of said cylindrical portion close to the opening of the mold cavity; and
   first and second washers detachably fixed to said lip and flange annular portions of the third part, with each of said annular portions of the membrane being clamped between one of said washers and the corresponding portion of the third part.

8. A mold according to claim 7, wherein the membrane further includes two flared portions interconnecting the cylindrical portion with respective ones of said lip and flange annular portions, said flared portions flaring away from the cylindrical portion, and wherein said first part has a projecting portion which is closely engaged in a central hole of the lip annular portion of said third part, said projecting portion and said central hole being frustoconical in shape having the same taper as that one of the two flared portions of the membrane which is sandwiched between said projecting portion and said lip annular portion.

9. A mold according to claim 3, wherein said second passage means has one end opening out into said variable volume annular chamber and its other end connected to a vacuum source.

10. A mold according to claim 7, said second passage means has one end opening out into said variable volume annular chamber and its other end connected to a vacuum source, and wherein said passage comprises: a first radial bore through the cylindrical portion of the third part; an annular chamber provided between the second and third parts; and a second radial bore extending through the second part.

* * * * *

UNITED STATES PATENT AND TRADEMARK OFFICE
CERTIFICATE OF CORRECTION

PATENT NO. : 4,844,143

DATED : July 4, 1989

INVENTOR(S) : Patrick Herbin et al.

It is certified that error appears in the above-identified patent and that said Letters Patent is hereby corrected as shown below:

ON THE TITLE PAGE:   Item [75]
The last inventor's name is incorrect, should be, --Jean-Claude Lacroix--.

Signed and Sealed this

Twenty-fourth Day of November, 1992

Attest:

DOUGLAS B. COMER

*Attesting Officer*             *Acting Commissioner of Patents and Trademarks*